July 25, 1961  L. DEVOL  2,994,023
MOTOR
Filed Oct. 30, 1958
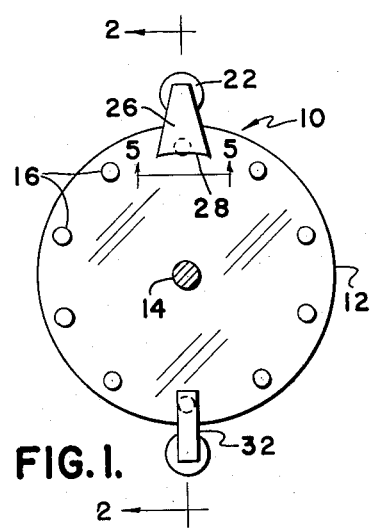
FIG. 1.
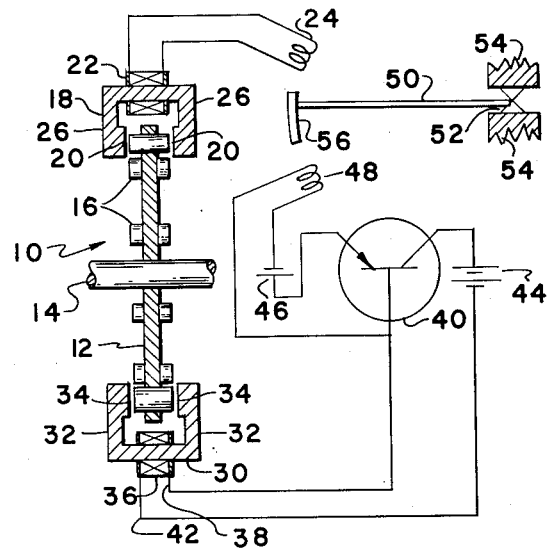
FIG. 2.
FIG. 5.
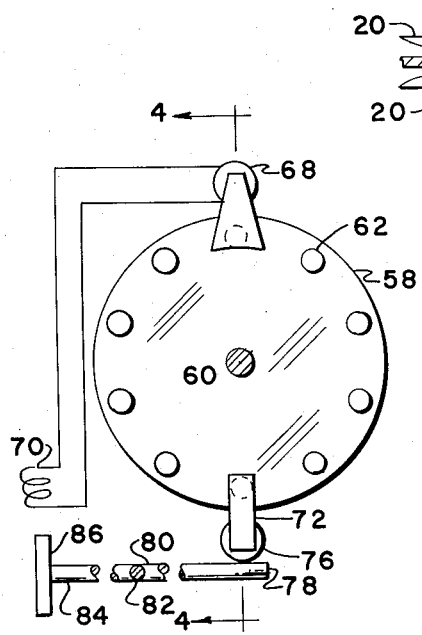
FIG. 3.
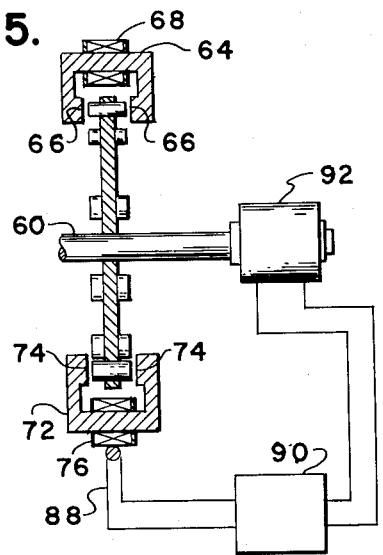
FIG. 4.
INVENTOR
Lee Devol
BY
Diggins & LeBlanc
ATTORNEYS

United States Patent Office 2,994,023
Patented July 25, 1961

2,994,023
MOTOR
Lee Devol, Dayton, Ohio, assignor to Hamilton Watch Company, Lancaster, Pa., a corporation of Pennsylvania
Filed Oct. 30, 1958, Ser. No. 770,846
5 Claims. (Cl. 318—138)

This invention relates to timekeeping devices and more particularly relates to a slow-speed accurately controlled motor capable of being used in timekeeping mechanisms such as watches or clocks.

In many instances, it is desirable to provide a timekeeping device large or small, which derives its power from a direct current source. An example of a small device may be an electric wristwatch of the type illustrated in assignee's copending application Serial No. 409,934, filed February 12, 1954, now allowed. An example of the latter large type of timekeeper is provided by the well known automobile clock which utilizes the direct current battery power to periodically wind a spring which actually runs the clock. In those cases where the direct current power is utilized to directly drive the clock mechanism, as opposed to a spring-driven mechanism of the automobile clock-type, it has been conventional to utilize some type of device for producing an oscillating motion which is then transformed into rotating motion to drive the hands of the clock. An example of this type device is illustrated in assignee's patent to Koehler, No. 2,662,366.

As opposed to the foregoing type of known devices, this invention is directed to a timekeeping device, either of the watch or clock type which is directly driven by direct current power through the use of an impulse motor having an extremely accurate speed control. In order to obtain this speed control, resort is had to the natural stability of oscillation of a vibrating member which is used as a control element.

It is accordingly a primary object of the present invention to provide a timekeeping device which is directly driven by means of a direct current motor having a highly accurate speed control.

It is another object of the invention to provide a timekeeping device directly driven by a direct current motor which is controlled by a vibrating element.

It is still another object of the invention to provide an improved timekeeping device driven from a direct current source through the use of a slow speed motor which is directly controlled by means of a vibrating element.

It is a still further object of the invention to provide a timekeeping device of the foregoing type controlled by a vibrating element.

These and further objects and advantages of the invention will become more apparent upon reference to the following specification and claims and the appended drawings wherein:

FIGURE 1 is a plan view showing an impulse motor for powering a timekeeping device according to one embodiment of the invention;

FIGURE 2 is a partial vertical section taken along the line 2—2 of FIGURE 1 and also showing diagrammatically the control arrangement for controlling the speed of the impulse motor;

FIGURE 3 is a plan view of an impulse motor for powering a timekeeping device according to another embodiment of the present invention;

FIGURE 4 is a partial vertical section through the impulse motor of FIGURE 3 taken along the line 4—4 of FIGURE 3 and also showing diagrammatically the arrangement for providing driving power; and FIGURE 5 is a partial cross section along the line 5—5 in FIGURE 1 showing the shape of the poles of the upper electromagnet.

Referring more particularly to FIGURES 1 and 2, there is shown an impulse motor 10 which consists of a non-magnetic disc 12 mounted upon a shaft 14 which may be connected to drive the train of a watch or clock, not shown. The disc 12 may be formed of any suitable material such as a non-magnetic metal or a synthetic resin which may be molded or cast. Mounted within the disc 12 at equidistant points about its periphery are a series of small cylindrical permanent magnets 16 which extend from each surface of the disc. These may be cast or molded into place at the time that the disc itself is formed.

Mounted at the top of the disc 12 in FIGURES 1 and 2 is a C-shaped magnetic core 18 having poles 20 which, in an end view, have a tapered cross section as is seen in FIGURE 5. A solenoid type coil 22 is mounted on the core 18 and is connected to a second coil 24, seen in FIGURE 2. The top view of the poles 20 seen in FIGURE 1 shows that the legs 26 of the C-shaped magnets are of expanding shape and terminate in an arcuate edge 28 which overlies and underlies the path of the magnets 16 as the disc 12 rotates.

Mounted at the bottom of the disc 12 is a second C-shaped magnetic core 30 having legs 32 and poles 34 which are also arranged above and below the path of movement of the magnets 16. The legs 32 of the core 30 are parallel-sided rather than of the expanding shape of the legs of the core 18. One terminal 38 of the coil 36 is connected to the base of a PNP junction-type transistor 40, while the other terminal 42 of the coil 36 is connected to one terminal of a primary cell 44. The other terminal of this primary cell is connected to the collector of the transistor 40. The emitter of the transistor 40 is connected to a second primary cell 46 and the other terminal of this cell is connected to a coil 48 which is also connected to the base of the transistor. It will be obvious that sources of direct current power other than primary cells may be used.

A suitable mechanical vibrator which may consist of a bar 50 supported by a spring element 52 between supports 54 carries an arcuate permanent magnet 56 at its outer end. While a spring mounted rod is shown as the mechanical vibrator, it will be obvious to those skilled in the art that other equivalent types of vibrators may be utilized. The magnet 56 is so disposed that upon vibration of the rod 50 the ends thereof enter or at least approach the coils 24 and 48 to create electrical impulses therein.

The operation of this embodiment of the invention is as follows:

The mechanical vibrator or rod 50 is maintained in vibration through a magnetic impulse delivered by the coil 24 acting upon the permanent magnet 56. The impulse in coil 24 is caused by the passage between the poles 20 of core 18 of one of the cylindrical magnets 16 on the disc 12 as that disc rotates. As these cylindrical magnets pass between the poles 20 a voltage is generated in the coil 22 which in turn energizes coil 24 to impart energy to the permanent magnet 56 and bar 50 to sustain it in oscillation or vibration. The poles 20 on the core 18 are shaped in the manner shown in FIGURE 5 in order to allow the flux to build up slowly in order to maintain the magnetic pulse from the coil 24 over a relatively long period of time.

The disc 12 is driven by the lower core 32 and its associated coil 36. Referring to FIGURE 2, it will be seen that upon each downward movement of the permanent magnet 56 on rod 50 of the vibrator an impulse is generated in coil 48 which is amplified by the transistor 40 and its associated primary cells 44 and 46. The transistor is normally held in the "off" condition by a negative bias supplied by the primary cell 46 until triggered by the pulse from the coil 48. This provides an amplified pulse through the coil 36 which creates a flux opposing that of the adjacent permanent magnet 16, so as to impart a force to the disc to maintain rotation.

The correct speed of the disc is very accurately maintained by the time-phase relationship between the pulse in coil 36 and the position of the repelled magnet 16. If the disc is rotating too fast, the magnet closest poles 34 of core 32 will be farther away from the poles 34 at the time of the impulse and will not receive so great a repelling force. Conversely, if the disc is rotating too slowly, the magnet 16 will be closer to the poles 34 and will receive a greater repelling force. The accuracy of speed control is that of the mechanical vibrator which is known to be a highly accurate timekeeping element.

Referring now to FIGURES 3 and 4, there is shown another embodiment of the invention wherein a non-magnetic disc 58 is mounted upon a shaft 60 which is connected to drive the train of a timekeeping mechanism, not shown. Mounted equidistantly about the periphery of the disc 58 are a series of small, cylindrical permanent magnets 62 of the same type as discussed in connection with the preceding embodiment of the invention. Also similar to the preceding embodiment is the C-shaped core 64 mounted at the top of the disc 58 in FIGURES 3 and 4 and having poles 66 similar to those previously described. A coil 68 is mounted on this core and has its terminals connected to a second coil 70 seen in FIGURE 3. The lower portion of the disc 58 has mounted thereabout a second C-shaped core 72 similar to that mounted at the lower portion of the disc in the preceding embodiment of the invention. This core is provided with poles 74 and has a coil 76 mounted thereon.

Contrary to the preceding embodiment of the invention, however, the core 72 is not stationarily mounted but is carried by one end 78 of a vibrating reed or bar 80 mounted on a torsion member 82. This torsion member 82 may itself be a bar or wire of adequate size to support the reed or bar 80 and core assembly at the end thereof and to sustain it is vibration. The other end 84 of reed or bar 80 carries a permanent magnet 86 which is mounted to enter or approach the end of the coil 70 as the reed or bar vibrates.

Referring to FIGURE 4, the coil 76 is connected by flexible leads 88 to a suitable amplifier 90 which may be a transistor amplifier of the type discussed in connection with the preceding embodiment of the invention or any other type of equivalent amplifier. The output of the amplifier drives a small motor 92 which may consist of a permanent magnet rotor and a two-pole stator whose energy is supplied from the amplifier 90.

The operation of this embodiment of the invention is as follows:

The reed or bar 80 is maintained in vibration by means of the coil 70 receiving impulses from the coil 68 as the magnets 62 rotate past the poles 66 of the core 64. This vibration of the reed or bar moves the core 72 into and out of the position shown in FIGURE 3. Rotation of the disc 58 is sustained by the motor 92 which receives driving power from the amplifier 90 controlled by the coil 76. In this embodiment the magnitude of the impulse driving the motor 92 governs the speed of the motor. If the disc is slow, the coil 76 is positioned closer to the magnet 62 by virtue of the action of the vibrator and will receive a larger impulse. Conversely, if the disc is fast the coil 76 is positioned farther from the magnet 62 and receives a lesser impulse.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A motor of accurate speed comprising a rotor and stator, said stator including a first electromagnetic means providing a first air gap through which the marginal edge of said rotor passes, a mechanical vibrator, coil means positioned adjacent one end of said vibrator, said first electromagnetic means being connected to said coil means to provide periodic impulses to said vibrator at a period determined by the rate of rotation of said rotor, said stator including a second electromagnetic means providing a second air gap through which the marginal edge of said rotor passes, and an amplifier delivering power to said second electromagnetic means, said second electromagnetic means controlling the speed of rotation of said rotor, said mechanical vibrator controlling the energy pulses produced by said second electromagnetic means.

2. A motor as set out in claim 1 wherein said rotor comprises a non-magnetic member carrying a series of magnetic members equidistantly spaced about its periphery and passing through said first and second air gaps provided by said first and second electromagnetic means.

3. A motor as set out in claim 2 wherein said electromagnetic means comprise generally C-shaped cores having poles mounted adjacent the path of movement of said magnetic members and having coil means thereon.

4. A motor as set out in claim 3 including a second coil means associated with said vibrator and connected to said amplifier to control the power it delivers to said second electromagnetic means.

5. A motor of accurate speed comprising a rotor and stator, said stator including a first electromagnetic means providing a first air gap through which the marginal edge of said rotor passes, a mechanical vibrator, coil means positioned adjacent one end of said vibrator, said first electromagnetic means being connected to said coil means to provide periodic impulses to said vibrator at a period determined by the rate of rotation of said rotor, said stator including a second electromagnetic means providing a second air gap through which the marginal edge of said rotor passes, an electric motor driving said rotor, and an amplifier connected to said second electromagnetic means and delivering power to said electric motor, said second electromagnetic means being mounted on said vibrator for vibration therewith and controlling the speed of rotation of said rotor, said mechanical vibrator controlling the energy pulses produced by said second electromagnetic means.

References Cited in the file of this patent

UNITED STATES PATENTS 2,877,399  Shaull _____ Mar. 10, 1959

FOREIGN PATENTS 1,092,411  France _____ Nov. 10, 1954